(12) United States Patent
Jin et al.

(10) Patent No.: US 10,979,942 B2
(45) Date of Patent: Apr. 13, 2021

(54) DATA TRANSMISSION METHOD, NETWORK DEVICE, AND TERMINAL DEVICE

(71) Applicant: HUAWEI TECHNOLOGIES CO., LTD., Shenzhen (CN)

(72) Inventors: Yinghao Jin, Shanghai (CN); Yang Yang, Shanghai (CN); Feng Han, Shanghai (CN); Yinggang Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/523,986

(22) Filed: Jul. 26, 2019

(65) Prior Publication Data
US 2019/0357091 A1 Nov. 21, 2019

Related U.S. Application Data

(63) Continuation of application No. PCT/CN2018/074032, filed on Jan. 24, 2018.

(30) Foreign Application Priority Data

Jan. 26, 2017 (CN) .......................... 201710061847.4

(51) Int. Cl.
*H04W 36/00* (2009.01)
*H04W 76/27* (2018.01)
(Continued)

(52) U.S. Cl.
CPC ....... *H04W 36/0033* (2013.01); *H04L 5/0055* (2013.01); *H04W 36/0055* (2013.01); *H04W 76/27* (2018.02); *H04W 92/20* (2013.01)

(58) Field of Classification Search
CPC ............. H04W 36/0033; H04W 76/27; H04W 36/0055; H04L 5/0055
See application file for complete search history.

(56) References Cited

U.S. PATENT DOCUMENTS

2014/0179325 A1   6/2014  Xu et al.
2016/0157295 A1   6/2016  Qin
(Continued)

FOREIGN PATENT DOCUMENTS

CA         2863424 A1    8/2013
CN      103796286 A      5/2014
(Continued)

OTHER PUBLICATIONS

Ericsson: "Handling of inactive UEs", 3GPP Draft; R2-163998, May 2016, XP051089658, total 6 pages.
(Continued)

*Primary Examiner* — Ronald B Abelson
(74) *Attorney, Agent, or Firm* — Kilpatrick Townsend & Stockton LLP

(57) ABSTRACT

A data transmission method and a network device are provided. The method can include: determining, by a first network device, that a terminal device enters an RRC inactive state; sending, by the first network device, a first message to a second network device, where the first message is used to configure the second network device, so that the second network device transmits data for the terminal device in the RRC inactive state; and receiving, by the first network device, an acknowledgment message the first message and sent by the second network device. The second network device can transmit data of the terminal device to the first network device to enable the first network device to send the data to a core network, without having to establish a path between the second network device and the core network for (Continued)

the second network device to send the data to the core network.

18 Claims, 4 Drawing Sheets

(51) Int. Cl.
*H04L 5/00* (2006.01)
*H04W 92/20* (2009.01)

(56) References Cited

U.S. PATENT DOCUMENTS

2019/0082490 A1  3/2019  Zhang et al.
2019/0174305 A1* 6/2019  Liang .................... H04W 12/00

FOREIGN PATENT DOCUMENTS

| | | |
|---|---|---|
| CN | 104145489 A | 11/2014 |
| CN | 104378777 A | 2/2015 |
| CN | 104869599 A | 8/2015 |
| CN | 105657861 A | 6/2016 |
| CN | 105898894 A | 8/2016 |
| WO | 2015035591 A1 | 3/2015 |

OTHER PUBLICATIONS

3rd Generation Partnership Project; Technical Specification Group Services and System Aspects; Study on Architecture for Next Generation System (Release 14), 3GPP Standard; 3GPP TR 23.799, No. V14.0.0, Dec. 16, 2016, pp. 1-522, XP051230010.

3GPP TR 23.799 V1.0.2:"3rd Generation Partnership Project;Technical Specification Group Services and System Aspects;Study on Architecture for Next Generation System(Release 14)",Sep. 2016,total 423 pages.

* cited by examiner

DATA TRANSMISSION METHOD, NETWORK DEVICE, AND TERMINAL DEVICE

CROSS-REFERENCE TO RELATED APPLICATIONS

This application is a continuation of International Application No. PCT/CN2018/074032, filed on Jan. 24, 2018, which claims priority to Chinese Patent Application No. 2017/10061847.4, filed on Jan. 26, 2017. The disclosures of the aforementioned applications are hereby incorporated by reference in their entireties.

TECHNICAL FIELD

This application relates to the field of communications technologies, and in particular, to a data transmission method, a network device, and a terminal device.

BACKGROUND

During movement, a terminal device departs from a cell covered by a network device that originally serves the terminal device, and arrives at a cell covered by a new network device. In the prior art, the terminal device is handed over from the cell covered by the original network device to the cell covered by the new network device. During the handover, a user needs to initiate an access request to the new network device. The new network device obtains context information of the terminal device from the original network device. The new network device needs to transfer a path with a core network device. This increases signaling interaction between the network device and a core network, greatly wasting resources.

SUMMARY

This application provides a data transmission method, a network device, and a terminal device, so as to resolve a problem of relatively large signaling overheads caused by handover when a terminal device in an RRC inactive state moves to a coverage area of a new network device and needs to transmit data.

According to a first aspect, this application provides a data transmission method, including:

determining, by a first network device, that a terminal device enters a radio resource control RRC inactive state;

sending, by the first network device, a first message to a second network device, where the first message is used to configure the second network device, so that the second network device may transmit data for the terminal device in the RRC inactive state; and receiving, by the first network device, an acknowledgment message that is for the first message and that is sent by the second network device.

In some possible implementations, the first message includes identification information of the first network device, identification information of the terminal device, a bearer that needs to be provided by the second network device for transmitting data for the terminal device in the RRC inactive state, and address information of the bearer on an Xn interface of the first network device.

In some possible implementations, the first message further includes one or any combination of the following information: network slice information of the bearer, logical channel configuration information corresponding to the bearer, or protocol stack configuration information corresponding to the bearer.

In some possible implementations, the acknowledgment message that is for the first message and that is sent by the second network device includes a bearer that can be provided by the second network device.

In some possible implementations, the acknowledgment message that is for the first message and that is sent by the second network device further includes address information corresponding to the bearer on an Xn interface of the second network device.

In some possible implementations, after the receiving, by the first network device, an acknowledgment message that is for the first message and that is sent by the second network device, the method further includes: sending, by the first network device, a second message to the terminal device, where the second message is used to indicate the second network device that can transmit data for the terminal device in the RRC inactive state.

In some possible implementations, the second message includes identification information of all the second network devices that can send data for the terminal device in the RRC inactive state.

In some possible implementations, the second message includes bitmap information of a radio access network-based notification area RNA of the first network device, and the bitmap information of the RNA of the first network device is used to identify, in an RNA range of the first network device, all the second network devices that can transmit data for the terminal device in the RRC inactive state.

In some possible implementations, the second message includes indicator bit information, and the indicator bit information is used to indicate whether all the second network devices in the RNA range of the first network device can transmit data for the terminal device in the RRC inactive state.

In some possible implementations, the second message further includes a bearer list, and the bearer list is used to indicate a bearer that can be provided by the second network device that can transmit data for the terminal device in the RRC inactive state.

In some possible implementations, after the receiving, by the first network device, an acknowledgment message that is for the first message and that is sent by the second network device, the method further includes:

directly sending, by the first network device to a core network, a received data packet transmitted by the second network device, where the data packet transmitted by the second network device is a data packet that is sent by the terminal device in the RRC inactive state and that is received by the second network device.

In some possible implementations, after the receiving, by the first network device, an acknowledgment message that is for the first message and that is sent by the second network device, the method further includes:

sending, by the first network device to a core network, a received data packet that is transmitted by the second network device and that is processed by using a protocol stack, where the protocol stack includes one or any combination of the following layers: a physical (PHY) layer, a media access control (MAC) layer, a radio link control (RLC) layer, or a packet data convergence protocol (PDCP) layer.

In some possible implementations, the data packet sent by the terminal device in the RRC inactive state includes an indication field, a data field, and a MAC CE field, the MAC CE field is used to store identification information of the terminal device, and the indication field is used to indicate that the data packet includes the MAC CE field.

According to a second aspect, this application provides a data transmission method, including:

receiving, by a second network device, a first message sent by a first network device, wherein the first message is used to configure the second network device, so that the second network device may transmit data for the terminal device in an RRC inactive state; and sending, by the second network device, an acknowledgment message for the first message to the first network device.

In some possible implementations, the first message includes identification information of the first network device, identification information of the terminal device, a bearer that needs to be provided by the second network device for transmitting data for the terminal device in the RRC inactive state, and address information of the bearer on an Xn interface of the first network device.

In some possible implementations, the first message further includes one or any combination of the following information: network slice information of the bearer, logical channel configuration information corresponding to the bearer, or protocol stack configuration information corresponding to the bearer.

In some possible implementations, the acknowledgment message for the first message includes a bearer that can be provided by the second network device.

In some possible implementations, the acknowledgment message for the first message further includes address information corresponding to the bearer on an Xn interface of the second network device.

In some possible implementations, after the sending, by the second network device, an acknowledgment message for the first message to the first network device, the method further includes:

receiving, by the second network device, a data packet sent by the terminal device in the RRC inactive state; and directly sending, by the second network device, the data packet to the first network device.

In some possible implementations, after the sending, by the second network device, an acknowledgment message for the first message to the first network device, the method further includes:

receiving, by the second network device, a data packet sent by the terminal device in the RRC inactive state;

processing, by the second network device, the data packet by using a protocol stack, where the protocol stack includes one or any combination of the following layers: a physical (PHY) layer, a media access control (MAC) layer, a radio link control (RLC) layer, or a packet data convergence protocol (PDCP) layer; and sending, by the second network device, a processed data packet to the first network device.

In some possible implementations, the data packet sent by the terminal device in the RRC inactive state includes an indication field, a data field, and a MAC CE field, the MAC CE field is used to store identification information of the terminal device, and the indication field is used to indicate that the data packet includes the MAC CE field.

According to a third aspect, this application provides a data transmission method, including:

entering, by a terminal device, an RRC inactive state;

sending, by the terminal device in the RRC inactive state, a data packet to a second network device.

In some possible implementations, after the entering, by a terminal device, an RRC inactive state, and before the sending, by the terminal device in the RRC inactive state, a data packet to a second network device, the method further includes: receiving, by the terminal device, a second message sent by the first network device, where the second message is used to indicate the second network device that can transmit data for the terminal device in the RRC inactive state.

In some possible implementations, the second message includes identification information of all the second network devices that can send data for the terminal device in the RRC inactive state.

In some possible implementations, the second message includes bitmap information of an RNA of the first network device, and the bitmap information of the RNA of the first network device is used to identify, in an RNA range of the first network device, all the second network devices that can transmit data for the terminal device in the RRC inactive state.

In some possible implementations, the second message includes indicator bit information, and the indicator bit information is used to indicate whether all the second network devices in the RNA range of the first network device can transmit data for the terminal device in the RRC inactive state.

In some possible implementations, the second message further includes a bearer list, and the bearer list is used to indicate a bearer that can be provided by the second network device that can transmit data for the terminal device in the RRC inactive state.

In some possible implementations, the data packet includes an indication field, a data field, and a MAC CE field, the MAC CE field is used to store identification information of the terminal device, and the indication field is used to indicate that the data packet includes the MAC CE field.

According to a fourth aspect, this application provides a network device, including:

a processor, configured to determine that a terminal device enters an RRC inactive state; and a transceiver, configured to: send a first message to a second network device, where the first message is used to configure the second network device, so that the second network device transmits data for the terminal device in the RRC inactive state; and receive an acknowledgment message that is for the first message and that is sent by the second network device.

In some possible implementations, the first message includes identification information of the network device, identification information of the terminal device, a bearer that needs to be provided by the second network device for transmitting data for the terminal device in the RRC inactive state, and address information of the bearer on an Xn interface of the network device.

In some possible implementations, the first message further includes one or any combination of the following information: network slice information of the bearer, logical channel configuration information corresponding to the bearer, or protocol stack configuration information corresponding to the bearer.

In some possible implementations, the acknowledgment message that is for the first message and that is sent by the second network device includes a bearer that can be provided by the second network device.

In some possible implementations, the acknowledgment message that is for the first message and that is sent by the second network device further includes address information corresponding to the bearer on an Xn interface of the second network device.

In some possible implementations, the transceiver is further configured to send a second message to the terminal device, where the second message is used to indicate the second network device that can transmit data for the terminal device in the RRC inactive state.

In some possible implementations, the second message includes identification information of all the second network devices that can send data for the terminal device in the RRC inactive state.

In some possible implementations, the second message includes bitmap information of an RNA of a first network device, and the bitmap information of the RNA of the first network device is used to identify, in an RNA range of the first network device, all the second network devices that can transmit data for the terminal device in the RRC inactive state.

In some possible implementations, the second message includes indicator bit information, and the indicator bit information is used to indicate whether all the second network devices in the RNA range of the first network device can transmit data for the terminal device in the RRC inactive state.

In some possible implementations, the second message further includes a bearer list, and the bearer list is used to indicate a bearer that can be provided by the second network device that can transmit data for the terminal device in the RRC inactive state.

In some possible implementations, the transceiver is further configured to: receive a data packet transmitted by the second network device, and send the data packet to a core network, where the data packet transmitted by the second network device is a data packet that is sent by the terminal device in the RRC inactive state and that is received by the second network device.

In some possible implementations, the transceiver is further configured to receive a data packet transmitted by the second network device;

the processor is further configured to process, by using a protocol stack, the data packet transmitted by the second network device, where the protocol stack includes one or any combination of the following layers: a physical (PHY) layer, a media access control (MAC) layer, a radio link control (RLC) layer, or a packet data convergence protocol (PDCP) layer; and the transceiver is further configured to send, to a core network, the data packet that is transmitted by the second network device and that is processed by using the protocol stack.

In some possible implementations, the data packet sent by the terminal device in the RRC inactive state includes an indication field, a data field, and a MAC CE field, the MAC CE field is used to store identification information of the terminal device, and the indication field is used to indicate that the data packet includes the MAC CE field.

According to a fifth aspect, this application provides a network device, including:

a transceiver, configured to: receive a first message sent by a first network device, where the first message is used to configure the network device, so that the network device transmits data for a terminal device in an RRC inactive state; and configured to send an acknowledgment message for the first message to the first network device.

In some possible implementations, the first message includes identification information of the first network device, identification information of the terminal device, a bearer that needs to be provided by the network device for transmitting data for the terminal device in the RRC inactive state, and address information of the bearer on an Xn interface of the first network device.

In some possible implementations, the first message further includes one or any combination of the following information: network slice information of the bearer, logical channel configuration information corresponding to the bearer, or protocol stack configuration information corresponding to the bearer.

In some possible implementations, the acknowledgment message for the first message includes a bearer that can be provided by the network device.

In some possible implementations, the acknowledgment message for the first message further includes address information corresponding to the bearer on an Xn interface of the network device.

In some possible implementations, the transceiver is further configured to: receive a data packet sent by the terminal device in the RRC inactive state; and directly forward the data packet to the first network device.

In some possible implementations, the transceiver is further configured to receive a data packet sent by the terminal device in the RRC inactive state;

the network device further includes a processor, configured to process the data packet by using a protocol stack, where the protocol stack includes one or any combination of the following layers: a physical (PHY) layer, a media access control (MAC) layer, a radio link control (RLC) layer, or a packet data convergence protocol (PDCP) layer; and the transceiver is further configured to send the data packet processed by using the protocol stack to the first network device.

In some possible implementations, the data packet sent by the terminal device in the RRC inactive state includes an indication field, a data field, and a MAC CE field, the MAC CE field is used to store identification information of the terminal device, and the indication field is used to indicate that the data packet includes the MAC CE field.

According to a sixth aspect, this application provides a terminal device, including:

a processor, configured to control the terminal device to enter an RRC inactive state; and a transceiver, configured to send, in the RRC inactive state, a data packet to a second network device.

In some possible implementations, the transceiver is further configured to receive a second message sent by the first network device, where the second message is used to indicate the second network device that can transmit data for the terminal device in the RRC inactive state.

In some possible implementations, the second message includes identification information of all the second network devices that can send data for the terminal device in the RRC inactive state.

In some possible implementations, the second message includes bitmap information of an RNA of the first network device, and the bitmap information of the RNA of the first network device is used to identify, in an RNA range of the first network device, all the second network devices that can transmit data for the terminal device in the RRC inactive state.

In some possible implementations, the second message includes indicator bit information, and the indicator bit information is used to indicate whether all the second network devices in the RNA range of the first network device can transmit data for the terminal device in the RRC inactive state.

In some possible implementations, the second message further includes a bearer list, and the bearer list is used to indicate a bearer that can be provided by the second network device that can transmit data for the terminal device in the RRC inactive state.

In some possible implementations, the data packet includes an indication field, a data field, and a MAC CE field, the MAC CE field is used to store identification information of the terminal device, and the indication field is used to indicate that the data packet includes the MAC CE field.

In the methods described in this application, if the first network device determines that the terminal device enters the RRC inactive state, the first network device sends, to the second network device, a first message for configuring the second network device, so that the second network device can transmit data for the terminal device in the RRC inactive state, to establish a data transmission path with the second network device. When receiving the data packet sent by the terminal device, the second network device sends the data packet to the first network device by using the data transmission path, so that the first network device sends the data packet to a core network. This reduces signaling overheads in an entire process in which the terminal device moves to a coverage area of the second network device and needs to transmit data to the core network.

DESCRIPTION OF EMBODIMENTS

Figure 1:
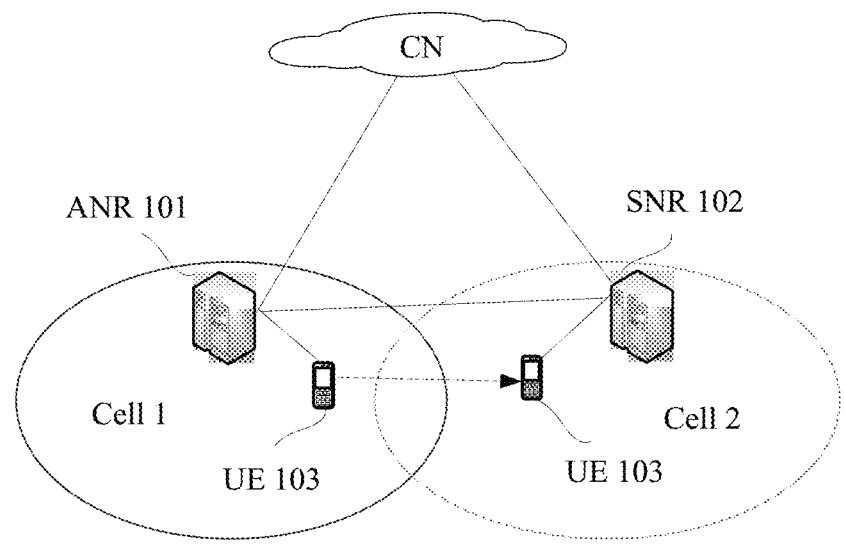
FIG. 1 is a schematic diagram of an application scenario according to an embodiment of this application.

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

It should be understood that the technical solutions of various embodiments may be applied to various communications systems, such as a global system for mobile communications (Global System for Mobile communication, "GSM" for short), a code division multiple access (Code Division Multiple Access, "CDMA" for short) system, a wideband code division multiple access (Wideband Code Division Multiple Access, "WCDMA" for short) system, a general packet radio service (General Packet Radio Service, "GPRS" for short), a long term evolution (Long Term Evolution, "LTE" for short) system, a universal mobile telecommunications system (Universal Mobile Telecommunication System, "UMTS" for short) and other current communications systems, and in particular, a future 5G system.

A terminal device in various embodiments may also be user equipment (User Equipment, "UE" for short), an access terminal, a subscriber unit, a subscriber station, a mobile station, a terminal device, a remote station, a remote terminal, a mobile device, a user terminal, a terminal, a wireless communications device, a user agent, or a user apparatus. The access terminal may be a cellular phone, a cordless phone, a session initiation protocol (Session Initiation Protocol, "SIP" for short) phone, a wireless local loop (Wireless Local Loop, "WLL" for short) station, a personal digital assistant (Personal Digital Assistant, "PDA" for short), a handheld device having a wireless communication function, a computing device or another processing device connected to a wireless modem, a vehicle-mounted device, a wearable device, a terminal device in a future 5G network, or a terminal device in a future evolved public land mobile network (Public Land Mobile Network, "PLMN" for short).

A network device in various embodiments may be a device configured to communicate with the terminal device. The network device may be a base transceiver station (Base Transceiver Station, "BTS" for short) in a GSM or a CDMA system, or may be a NodeB (NodeB, "NB" for short) in a WCDMA system, or may be an evolved NodeB (Evolutional NodeB, "eNB or eNodeB" for short) in an LTE system, or a radio controller in a cloud radio access network (Cloud Radio Access Network, "CRAM" for short) scenario. Alternatively, the network device may be a relay node, an access point, a vehicle-mounted device, a wearable device, a network device in a future 5G network, a network device in a future evolved PLMN network, or the like.

A radio resource control RRC inactive state mentioned in various embodiments is a state of a terminal device in a 5G network. A terminal device has three states in a 5G network: an RRC connected state, an RRC inactive state, and an idle state. The RRC connected state and the idle state are similar to those in an LTE system. Details are not described herein. The RRC inactive state is a state specific to the terminal device in the 5G network. The terminal device in the RRC inactive state has the following features:

1. Even if the terminal device has no data to be transmitted on an air interface, RRC context information of a user of the terminal device still remains on an RAN side, and the RAN side reserves a connection to a core network for the terminal device in the RRC inactive state.

2. The terminal device in the RRC inactive state may directly send an uplink small data packet, and does not need to be transferred to the RRC connected state by establishing RRC signaling.

In general, the RRC inactive state of the terminal device is a state between the RRC connected state and the idle state. Power savings can be achieved when the terminal device is in the RRC inactive state. When exchanging data with the RAN side, the terminal device does not need to be transferred to the RRC connected state, and can directly send/receive data. In addition, the RAN side may also directly and quickly send data to the core network or receive data from the core network, because the RAN side reserves a connection to the core network for the terminal device in the RRC inactive state.

Application scenarios in various embodiments are described below.

FIG. 1 shows an application scenario according to an embodiment of this application.

This scenario includes: a first network device, at least one second network device, and a terminal device. The first network device may be an Anchor New Radio ("ANR" for short) 101, the second network device may be an Assistant New Radio ("SNR" for short) 102, and the terminal device may be UE 103. A wired connection exists between the ANR 101 and the SNR 102. The UE 103 is currently in a Cell 1 covered by the ANR 101. The UE 103 is in a moving state and moves from the Cell 1 covered by the ANR 101 to a Cell 2 covered by the SNR 102.

Figure 2:
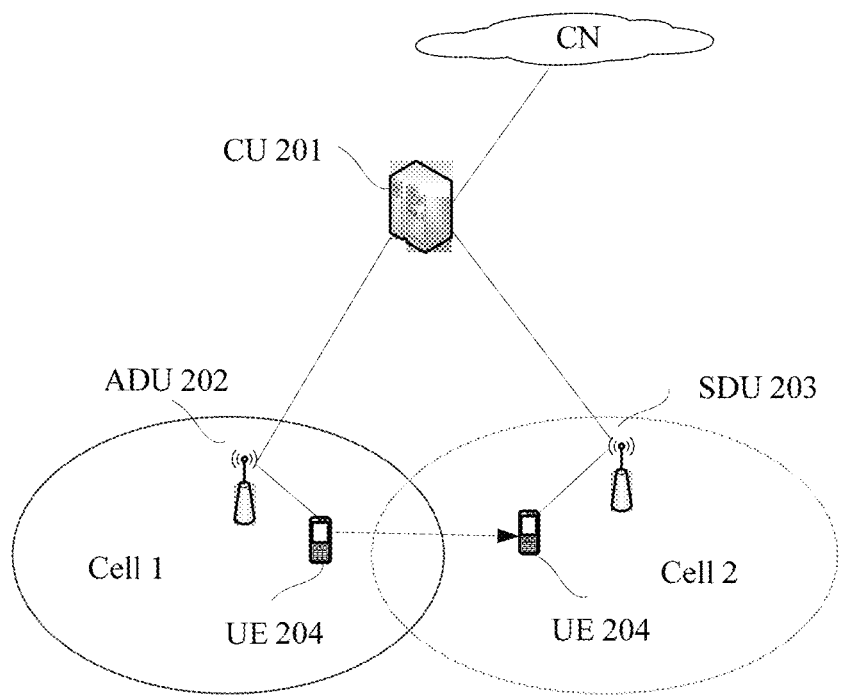
FIG. 2 is a schematic diagram of another application scenario according to an embodiment of this application.

FIG. 2 shows another application scenario according to an embodiment of this application.

This scenario includes: a central unit (Central Unit, "CU" for short) 201, an anchor distribution unit (Anchor Distribute Unit, "ADU" for short) 202, an assistant distribution unit (Assistant Distribute Unit, "SDU" for short) 203, and UE 204. The CU 201 controls the ADU 202 and the SDU 203. The UE 204 is currently in a Cell 1 covered by the ADU 202. The UE 204 is in a moving state and moves from the Cell 1 covered by the ADU 202 to a Cell 2 covered by the SDU 203.

Figure 3:
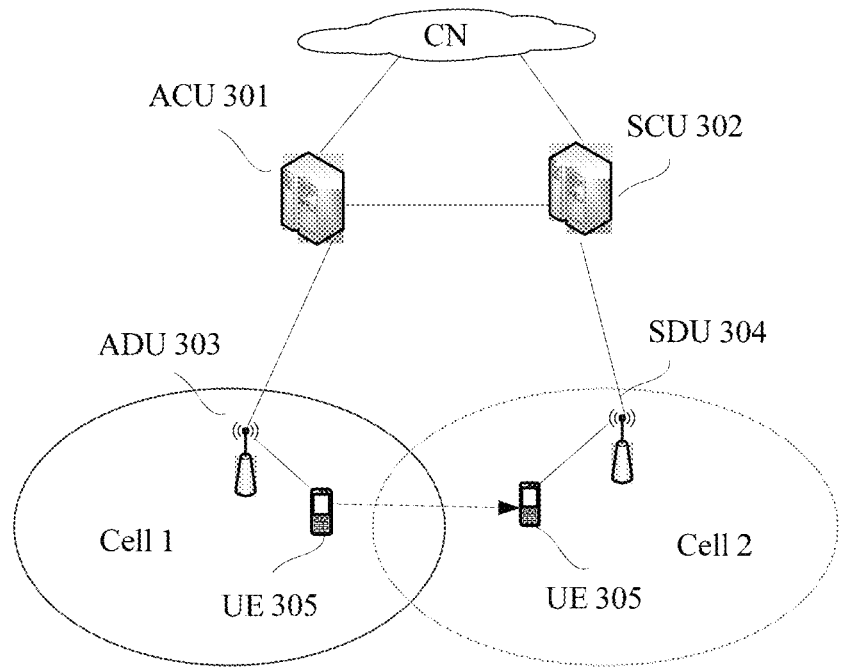
FIG. 3 is a schematic diagram of still another application scenario according to an embodiment of this application.

FIG. 3 shows still another application scenario according to an embodiment of this application.

This scenario includes: an anchor central unit (Anchor Central Unit, "ACU" for short) 301, an assistant central unit (Assistant Central Unit, "SCU" for short) 302, an anchor distribution unit (Anchor Distribute Unit, "ADU" for short) 303, an assistant distribution unit (Assistant Distribute Unit, "SDU" for short) 304, and UE 305. The ACU 301 controls the ADU 303, the SCU 302 controls the SDU 304, and a wired connection exists between the ACU 301 and the SCU 302. The UE 305 is currently in a Cell 1 covered by the ADU 303. The UE 305 is in a moving state and moves from the Cell 1 covered by the ADU 303 to a Cell 2 covered by the SDU 304.

Methods provided in this application are described below.

It should be noted herein that, the first network device may send a first message to a plurality of adjacent network devices. The second network device herein is merely a general name, and is not limited to one network device.

In addition, the network device in this application is an access network device.

Embodiment 1

Figure 4:
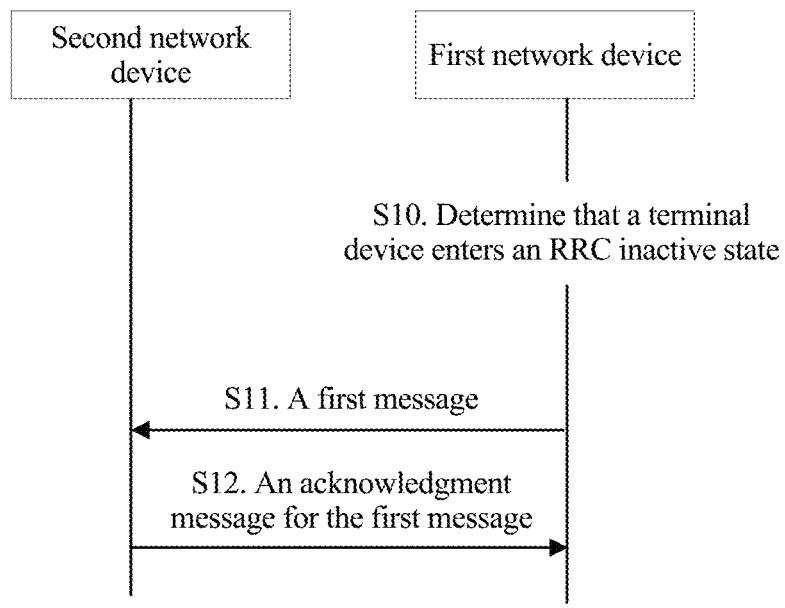
FIG. 4 is a flowchart of a data transmission method according to an embodiment of this application.

As shown in FIG. 4, a data transmission method includes the following steps.

S10. A first network device determines that a terminal device enters an RRC inactive state.

In S10, the terminal device in a coverage area of the first network device enters the RRC inactive state from an RRC connected state. It can be learned from a feature of the terminal device in the RRC inactive state that the first network device reserves at least one data plane connection of the terminal device to a core network.

The terminal device enters the RRC inactive state from the RRC connected state, and the first network device determines that the terminal device enters the RRC inactive state.

That the first network device determines that the terminal device enters the RRC inactive state includes: determining, by the first network device, that the terminal device is to enter the RRC inactive state, or determining, by the first network device, that the terminal device has entered the RRC inactive state.

The first network device determines that the terminal device is to enter the RRC inactive state. Specifically, the first network device may determine, based on a service status of the terminal device and the like, that the terminal device enters the RRC inactive state from the RRC connected state. For example, if it is detected that the terminal device transmits no service data over a period of time, for example, there is no uplink and downlink data transmission, the terminal device may be allowed to enter the RRC inactive state from the RRC connected state, thereby achieving power savings.

The first network device determines that the terminal device has entered the RRC inactive state. Specifically, the first network device has previously transferred the terminal device from the RRC connected state to the RRC inactive state by using RRC signaling. The RRC signaling may be state transition signaling or other RRC signaling.

S11. The first network device sends a first message to a second network device, where the first message is used to configure the second network device, so that the second network device may transmit data for the terminal device in the RRC inactive state.

In S11, as described in S10, in a coverage area of the first network device, the terminal device whose state is transferred enters the RRC inactive state from an RRC connected state. When the first network device detects that the state of the terminal device is transferred, the first network device sends the first message to a plurality of adjacent second network devices. The first message is intended to configure the second network device, so that when the terminal device in the RRC inactive state moves from the coverage area of the first network device to a coverage area of the second network device and needs to transmit data, the second network device may forward, to the first network device, the data that is sent by the terminal device to the second network device.

For the first network device, to achieve the objective of the first message, the first message sent by the first network device needs to include the following information: identification information of the first network device, identification information of the terminal device, a bearer that needs to be provided by the second network device for transmitting data for the terminal device in the RRC inactive state, and address information of the bearer on an Xn interface of the first network device.

A bearer that needs to be provided by the second network device for transmitting data for the terminal device in the RRC inactive state may be determined by referring to a bearer of the terminal device on the first network device. For example, the terminal device has five bearers (a bearer A, a bearer B, a bearer C, a bearer D, and a bearer E) on the first network device. The first network device may consider that the second network device needs to provide the five bearers (the bearer A, the bearer B, the bearer C, the bearer D, and the bearer E). Alternatively, the first network device considers that the second network device only needs to provide three bearers (the bearer A, the bearer B, and the bearer C) to implement data transmission. In this case, in the first message sent by the first network device, the bearer that needs to be provided by the second network device for transmitting data for the terminal device in the RRC inactive state is the three bearers (the bearer A, the bearer B, and the bearer C).

The address information of the bearer on the Xn interface of the first network device is used to instruct the second network device to send data of a corresponding bearer to a corresponding address on the Xn interface of the first network device. The Xn interface is an interface between gNBs (gNB)/cells in the fifth generation communications system.

The identification information of the terminal device may uniquely indicate the terminal device in the RAN Notification Area, and may be in one or a combination of the following forms: a C-RNTI (a cell radio network temporary identifier, which is a dynamic identifier allocated by a base station to UE, and uniquely identifies UE on a cell air interface) and an identifier in a third state allocated by the first network device to the terminal device. The identifier may be in a form of the C-RNTI only or the C-RNTI plus an identifier of the first network device.

The identifier of the first network device may be at least one of the following forms: a physical layer cell identifier, a global cell identifier, and a gNB UE XnAP ID (an ID that uniquely indicates a user on the Xn interface of the first network device).

In addition to the foregoing information, the first message may further include network slice information of the bearer, and/or logical channel configuration information corresponding to the bearer, and/or protocol stack configuration information corresponding to the bearer.

The protocol stack configuration information may be indication information, or configuration information of a specific protocol stack parameter and/or a function. The indication information is used to indicate that the second network device is configured based on a specified parameter and/or function.

The logical channel configuration information may be indication information, or configuration information of a specific logical channel parameter and/or a function. The indication information is used to indicate that the second network device is configured based on a specified parameter and/or function.

S12. The second network device sends an acknowledgment message for the first message to the first network device.

In S12, there are two mechanisms for the second network device to send the acknowledgment message for the first message.

A first mechanism is that the second network device sends the bearer that can be provided by the second network device to the first network device.

Further, the second network device may further send, to the first network device, the bearer that can be provided by the second network device and address information that is corresponding to the bearer that can be provided by the second network device and that is on an Xn interface of the second network device.

For example, in the first message sent by the first network device in S11, bearers that need to be provided by the second network device for transmitting data for the terminal device in the RRC inactive state include five bearers (a bearer A, a bearer B, a bearer C, a bearer D, and a bearer E). After receiving the first message in S11, the second network device determines, based on a resource scheduling status of the second network device, that only three of the five bearers can be provided (for example, the bearer A, the bearer B, and the bearer E). Therefore, in this case, the second network device sends the acknowledgment message for the first message. The acknowledgment message for the first message includes the three bearers (the bearer A, the bearer B, and the bearer E) that can be provided by the second network device.

Further, the second network device may send address information corresponding to the three bearers (the bearer A, the bearer B, and the bearer E) on the Xn interface of the second network device to the first network device.

A second mechanism is that the second network device sends the acknowledgment message to the first network device based on the resource scheduling status of the second network device and if all the bearers required in the first message in S11 can be provided. Still further, the second network device sends, to the first network device, the address information that is corresponding to the bearer required in the first message and that is on the Xn interface of the second network device.

If the second network device cannot provide all the bearers required in the first message in S11 based on the resource scheduling status of the second network device, the second network device rejects the request of the first network device. In this case, the acknowledgment message that is for the first message and that is sent by the second network device includes rejection information.

In this embodiment, if the terminal device in the RRC inactive state moves from the coverage area of the first network device to the coverage area of the second network device and needs to send data to the second network device, the second network device identifies the terminal device and a bearer to which the data sent by the terminal device belongs, and sends the data to the first network device based on the address information corresponding to the bearer in the first message on the Xn interface of the first network device, so that the first network device sends the data to the core network.

In this embodiment, the second network device transmits the data of the terminal device to the first network device, so that the first network device sends the data to the core network, without needing the second network device to establish a path between the second network device and the core network for the second network device to send the data to the core network. This reduces signaling overheads in an entire process in which the terminal device sends the data to the core network.

Embodiment 2

Figure 5:
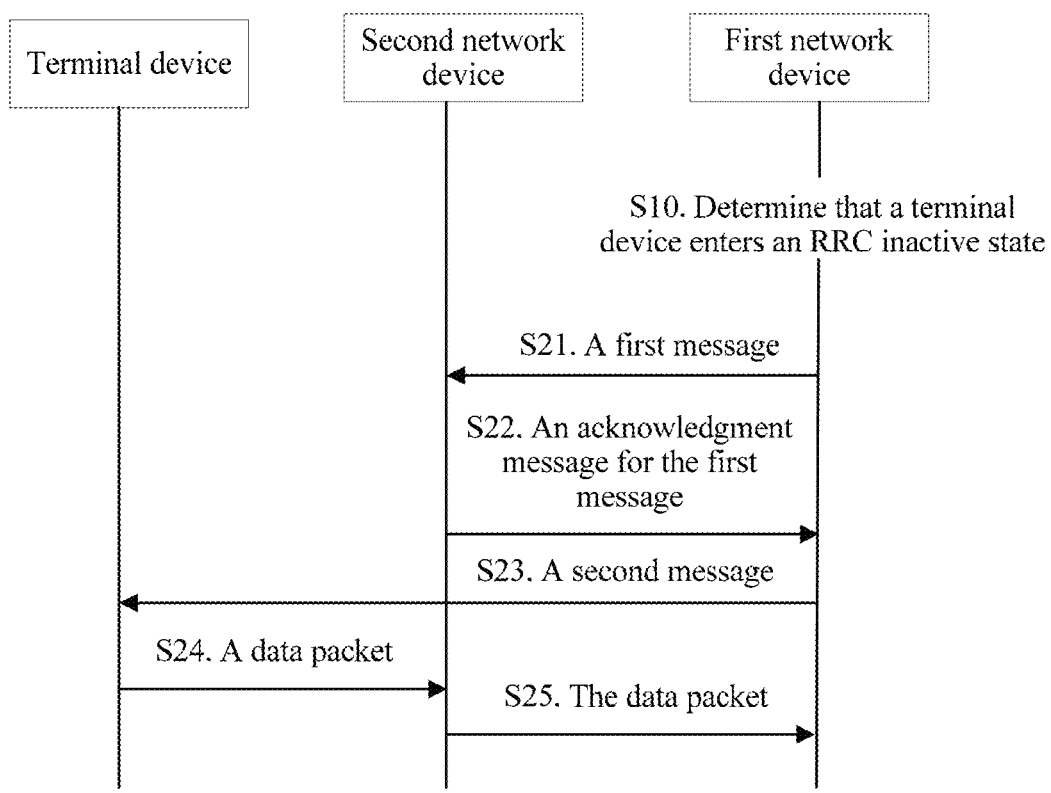
FIG. 5 is another flowchart of a data transmission method according to an embodiment of this application.

As shown in FIG. 5, a data transmission method includes the following steps.

S20. A first network device determines that a terminal device enters an RRC inactive state.

S21. The first network device sends a first message to a second network device, where the first message is used to configure the second network device, so that the second network device transmits data for the terminal device in the RRC inactive state.

S22. The second network device sends an acknowledgment message for the first message to the first network device.

S20 to S22 are the same as S10 to S12 in the foregoing embodiment, and details are not described herein again.

S23. The first network device sends a second message to the terminal device, where the second message is used to indicate the second network device that can transmit data for the terminal device in the RRC inactive state.

In S23, the first network device sends the second message to the terminal device based on the received acknowledgment message for the first message, where the second message indicates the second network device that can transmit data for the terminal device in the RRC inactive state.

The second message may have a plurality of forms, for example, a list of identification information of the second network device that can transmit data for the terminal device, for another example, bitmap information of an RNA of the first network device, and for still another example, indicator bit information.

1. The second message includes the list of identification information of the second network device that can transmit data for the terminal device, and all the second network devices in the list can relay data for the terminal device.

2. The second message includes the bitmap information of the RNA of the first network device. The bitmap information is specifically bitmap information of the RNA (RAN Notification Area) allocated by the first network device to the terminal in the RRC inactive state. The bitmap information is used to identify all the second network devices that can relay data for the terminal device in an RNA range allocated by the first network device to the terminal in the RRC inactive state.

The RNA allocated by the first network device to the terminal in the RRC inactive state is a radio access network based notification area (RAN based notification area, RNA) that is configured by the first network device for the terminal device when the terminal is in the inactive state. The RNA includes one or more cells. When the terminal device in the inactive state reselects another cell in the RAN range, the terminal device may not inform a network. However, when the terminal device reselects a cell beyond the RNA range, the terminal device needs to inform the network.

The bitmap information is a multi-bit string. A quantity of bits of the string may be the same as a quantity of cells in an RNA cell list, or may be a fixed quantity of bits. Each bit in the bitmap information indicates whether a corresponding cell in the RNA cell list (the RNA cell list indicates a cell included in the RNA) supports the terminal device in transmitting data in the inactive state. For example, if cells included in the RNA cell list are respectively a cell #1, a cell #2, a cell #4, and a cell #6, the bitmap information includes at least 4 bits. In addition, it is set that 0 in the bitmap information indicates that the cell does not support the terminal device in transmitting data in the inactive state, but 1 indicates that the cell supports the terminal device in transmitting data in the inactive state. Therefore, if the bitmap is 0101, it means that the cell #2 and the cell #6 support the terminal in transmitting data in the inactive state, but the cell #1 and the cell #4 do not support the terminal device in transmitting data in the inactive state. It should be noted that, the bitmap information may include more than 4 bits. For example, it is specified in a standard that the bitmap information includes fixed 16 bits. If only four cells are included in the RNA, it means that 4 bits of the 16 bits are specified to represent whether the cell in the RNA supports the terminal device in transmitting data (for example, the first 4 bits) in the inactive state, and the other 12 bits may be filled with 0. If six cells are included in the RNA, six bits may be specified to represent whether the cell in the RNA supports the terminal device in transmitting data (for example, the first six bits) in the inactive state, and the other 10 bits may be filled with 0.

The cell described in the foregoing paragraph may be corresponding to a corresponding network device. For example, the cell #1 and the cell #4 are cells covered by a second network device A, and the cell #2 and the cell #6 are cells covered by a second network device B.

3. The second message includes the indicator bit information, where the indicator bit information is used to indicate whether all the second network devices in the RNA range of the first network device can transmit data for the terminal device in the inactive state, and the RNA of the first network device is the RNA allocated by the first network device to the terminal in the RRC inactive state. The indicator bit information is represented by 1 bit. For example, if the bit is 1, it indicates that all the second network devices in the RNA range of the first network device can transmit data for the terminal device in the inactive state; if the bit is 0, it indicates that not all the second network devices in the RNA range of the first network device can transmit data for the terminal device in the inactive state.

Still further, in addition to indicating the second network device that can transmit data for the terminal device in the RRC inactive state, the second message may further indicate a bearer that can be provided by each second network device that can relay data. For example, the second network device indicated in the second message includes a second network device A, a second network device B, and a second network device C. A bearer that can be provided by the second network device A includes a bearer 1, a bearer 3, and a bearer 5; a bearer that can be provided by the second network device B includes a bearer 2 and a bearer 4; and a bearer that can be provided by the second network device C includes a bearer 3 and a bearer 5. The second message includes a bearer list of the second network devices that can transmit data for the terminal device in the RRC inactive state, as shown in the following table.

| Second network device that can transmit data for the terminal device in the RRC inactive state | Bearer that can be provided |
| --- | --- |
| Second network device A | Bearer 1, bearer 3, and bearer 5 |
| Second network device B | Bearer 2 and bearer 4 |
| Second network device C | Bearer 3 and bearer 5 |

Alternatively, for example, the second network device indicated in the second message includes a second network device A, a second network device B, and a second network device C. A bearer that can be provided by the second network device A includes a bearer 1, a bearer 3, and a bearer 5; a bearer that can be provided by the second network device B includes a bearer 2 and a bearer 4; and a bearer that can be provided by the second network device C includes a bearer 3 and a bearer 5. A minimum set may be selected. To be specific, the bitmap information indicates that only the second network device A and the second network device B can transmit data for the terminal in the RRC inactive state, and bearers that can be provided are the bearer 3 and the bearer 5.

S24. The terminal device in the RRC inactive state sends a data packet to the second network device.

In S24, after sending a pilot signal to obtain an uplink synchronization and/or uplink scheduling resource by using a random access process, the terminal device sends an uplink data packet to the second network device. Alternatively, in the case of no access process, the terminal device directly sends the data packet to the second network device by using a contention-based resource or a reserved resource (that is, in a Grant free manner).

The data packet sent by the terminal device in the RRC inactive state is a small data packet, and is generally a data packet whose size is less than a preset threshold. The terminal device does not need to establish an RRC connection to transfer a state of the terminal device to the RRC connected state and then send the small data packet. The terminal device directly sends the small data packet in the RRC inactive state. According to the method in this application, a problem of how to send an uplink small data packet to a core network when the terminal device in the RRC inactive state moves from a coverage area of the original first network device to a coverage area of the second network device is resolved.

The data packet sent by the terminal device in the RRC inactive state includes an indication field, a data field, and a MAC CE field. The MAC CE field is used to store identification information of the terminal device, and the indication field is used to indicate that the data packet includes the MAC CE field. Locations of the indication field, the data field, and the MAC CE field are not limited in this application.

Herein, the terminal device packages and generates to-be-sent data at a MAC layer, and the terminal device generates a to-be-sent data packet at the MAC layer. The data packet includes an indication field, a data field, and a MAC CE field. The MAC CE field is a new field, and is used to store identification information of the terminal device. After receiving the data packet, the second network device can obtain the identification information of the terminal device at the MAC layer through parsing, so as to quickly know a terminal device from which the data packet comes.

S25. The second network device sends the received data packet to the first network device, so that the first network device sends the data packet to a core network.

In S25, the second network device sends the received data packet to the first network device in two manners.

1. The second network device receives and directly forwards the data packet sent by the terminal device in the RRC inactive state.

2. The second network device receives the data packet sent by the terminal device in the RRC inactive state, and then sends the data packet after protocol stack processing to the first network device. The protocol stack includes one or any combination of the following layers: a physical (PHY) layer, a media access control (MAC) layer, a radio link control (RLC) layer, or a packet data convergence protocol (PDCP) layer.

The first network device sends the data packet to the core network in two manners as well.

1. The first network device receives and directly forwards the data packet sent by the second network device.

2. The first network device receives the data packet sent by the second network device, and then sends the data packet after protocol stack processing to the core network. The protocol stack includes one or any combination of the following layers: a physical (PHY) layer, a media access control (MAC) layer, a radio link control (RLC) layer, or a packet data convergence protocol (PDCP) layer.

In this embodiment, the second network device sends the data of the terminal device to the first network device, so that the first network device sends the data to the core network, without needing the second network device to establish a path between the second network device and the core network for the second network device to send the data to the core network. This reduces signaling overheads in an entire process in which the terminal device transmits the data to the core network.

The methods in the foregoing embodiment 1 and embodiment 2 are applicable to three application scenarios mentioned herein.

In the application scenario shown in FIG. 1, the first network device is an anchor network device ANR 101, and the second network device is an assistant network device SNR 102.

In the application scenario shown in FIG. 2, the first network device is a central unit CU 201, and the second network device is an assistant distribution unit SDU 203, where the central unit CU 201 controls the assistant distribution unit SDU 203.

In the application scenario shown in FIG. 3, the first network device is an anchor central unit ACU 301, the second network device is an assistant central unit SCU 302. The anchor central unit ACU 301 controls an anchor distribution unit ADU 303, and the assistant central unit SCU 302 controls an assistant distribution unit SDU 304.

That the first network device sends the first message to the second network device includes:

sending, by the anchor central unit ACU 301, the first message to the assistant central unit SCU 302, so that the assistant central unit SCU 302 sends the first message to the assistant distribution unit SDU 304.

That the first network device receives an acknowledgment message that is for the first message and that is sent by the second network device includes:

receiving, by the anchor central unit ACU 301, the acknowledgment message that is for the first message and that is sent by the assistant distribution unit SDU 304 by using the assistant central unit SCU 302, where the acknowledgment message for the first message is generated by the assistant distribution unit SDU 304 based on the received first message sent by the assistant central unit SCU 302.

The foregoing has described in detail the data transmission method in various embodiments. The following describes a network device and a terminal device in various embodiments. It should be understood that, the network device and the terminal device in various embodiments may perform the data transmission method in the foregoing embodiments. For achieving this, in some embodiments, for a specific working process of the following two network devices and a specific working process of the terminal device, refer to a corresponding process in the method in the foregoing embodiment.

Embodiment 3

Figure 6:
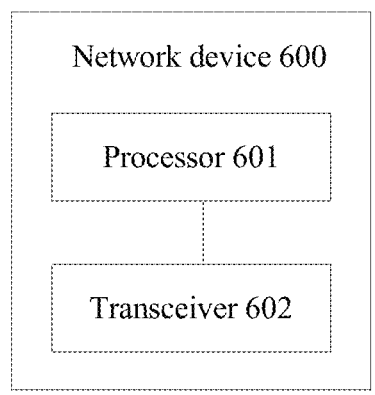
FIG. 6 is a schematic block diagram of a network device 600 according to an embodiment of this application.

FIG. 6 shows a schematic block diagram of a network device 600 according to an embodiment of this application. The network device 600 may be the first network device in the foregoing method embodiments. As shown in FIG. 6, the network device 600 includes:

a processor 601, configured to determine that a terminal device enters an RRC inactive state; and a transceiver 602, configured to: send a first message to a second network device, where the first message is used to configure the second network device, so that the second network device transmits data for the terminal device in the RRC inactive state; and receive an acknowledgment message that is for the first message and that is sent by the second network device.

The first message includes identification information of the network device, identification information of the terminal device, a bearer that needs to be provided by the second network device for transmitting data for the terminal device in the RRC inactive state, and address information of the bearer on an Xn interface of the network device. Optionally, the first message further includes one or any combination of the following information: network slice information of the bearer, logical channel configuration information corresponding to the bearer, or protocol stack configuration information corresponding to the bearer.

The acknowledgment message that is for the first message and that is sent by the second network device includes a bearer that can be provided by the second network device. Optionally, the acknowledgment message that is for the first message and that is sent by the second network device further includes address information corresponding to the bearer on an Xn interface of the second network device.

In some implementations, the transceiver 602 is further configured to send a second message to the terminal device, where the second message is used to indicate the second network device that can transmit data for the terminal device in the RRC inactive state.

In some embodiments, the second message includes identification information of all the second network devices that can send data for the terminal device in the RRC inactive state. Optionally, the second message includes bitmap information of an RNA of the first network device, and the bitmap information of the RNA of the first network device is used to identify, in an RNA range of the first network device, all the second network devices that can transmit data for the terminal device in the RRC inactive state. Optionally, the second message includes indicator bit information, and the indicator bit information is used to indicate whether all the second network devices in the RNA range of the first network device can transmit data for the terminal device in the RRC inactive state. Optionally, the second message further includes a bearer list, and the bearer list is used to indicate a bearer that can be provided by the second network device that can transmit data for the terminal device in the RRC inactive state.

In some implementations, the transceiver 602 is further configured to: receive a data packet transmitted by the second network device, and send the data packet to a core network, where the data packet transmitted by the second network device is a data packet that is sent by the terminal device in the RRC inactive state and that is received and directly forwarded by the second network device, or a data packet that is sent by the terminal device in the RRC inactive state and that is received by the second network device and processed by using a protocol stack.

In some implementations, the transceiver 602 is further configured to receive a data packet transmitted by the second network device, where the data packet transmitted by the second network device is a data packet that is sent by the terminal device in the RRC inactive state and that is received and directly forwarded by the second network device, or a data packet that is sent by the terminal device in the RRC inactive state and that is received by the second network device and processed by using a protocol stack. The processor 601 is further configured to process, by using a protocol stack, a data packet transmitted by the second network device, where the protocol stack includes one or any combination of the following layers: a physical (PHY) layer, a media access control (MAC) layer, a radio link control (RLC) layer, or a packet data convergence protocol (PDCP) layer. The transceiver 602 is further configured to send, to the core network, the data packet that is transmitted by the second network device and that is processed by using the protocol stack.

In the foregoing two implementations, in some embodiments, the data packet sent by the terminal device in the RRC inactive state includes an indication field, a data field, and a MAC CE field, the MAC CE field is used to store identification information of the terminal device, and the indication field is used to indicate that the data packet includes the MAC CE field.

The network device 600 in this embodiment of this application may be corresponding to the first network device in the method in various embodiments, and the foregoing and other operations and/or functions of modules in the network device 600 are respectively intended to implement corresponding procedures of the methods. For brevity, details are not described herein again.

Embodiment 4

Figure 7:
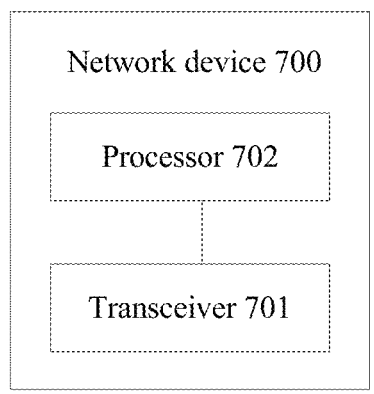
FIG. 7 is a schematic block diagram of a network device 700 according to an embodiment of this application.

FIG. 7 shows a schematic block diagram of a network device 700 according to an embodiment of this application. The network device 700 may be the second network device in the foregoing method embodiments. As shown in FIG. 7, the network device 700 includes:

a transceiver 701, configured to: receive a first message sent by a first network device, where the first message is used to configure the network device, so that the network device transmits data for a terminal device in an RRC inactive state, and configured to send an acknowledgment message for the first message to the first network device.

The first message includes identification information of the first network device, identification information of the terminal device, a bearer that needs to be provided by the network device for transmitting data for the terminal device in the RRC inactive state, and address information of the bearer on an Xn interface of the first network device. Optionally, the first message further includes one or any combination of the following information: network slice information of the bearer, logical channel configuration information corresponding to the bearer, or protocol stack configuration information corresponding to the bearer.

The acknowledgment message for the first message includes a bearer that can be provided by the network device. Optionally, the acknowledgment message for the first message further includes address information corresponding to the bearer on an Xn interface of the network device.

In some implementations, the transceiver 701 is further configured to: receive a data packet sent by the terminal device in the RRC inactive state; and directly forward the data packet to the first network device.

In some implementations, the transceiver 701 is further configured to receive a data packet sent by the terminal device in the RRC inactive state. The terminal device further includes a processor 702, configured to process the data packet by using a protocol stack, where the protocol stack includes one or any combination of the following layers: a physical (PHY) layer, a media access control (MAC) layer, a radio link control (RLC) layer, or a packet data convergence protocol (PDCP) layer. The transceiver 701 is further configured to send a processed data packet to the first network device.

In the foregoing two implementations, the data packet sent by the terminal device in the RRC inactive state includes an indication field, a data field, and a MAC CE field, the MAC CE field is used to store identification information of the terminal device, and the indication field is used to indicate that the data packet includes the MAC CE field.

The network device 700 in this embodiment may be corresponding to the second network device in the method in various embodiments, and the foregoing and other operations and/or functions of modules in the network device 700 are respectively intended to implement corresponding procedures of the methods. For brevity, details are not described herein again.

Embodiment 5

Figure 8:
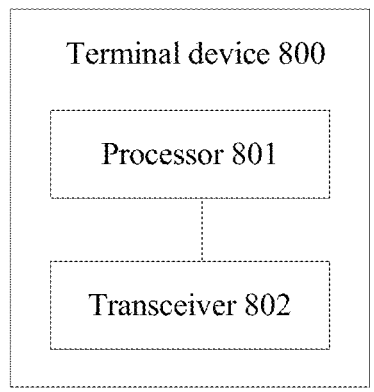
FIG. 8 is a schematic block diagram of a terminal device 800 according to an embodiment of this application.

FIG. 8 shows a schematic block diagram of a terminal device 800 according to an embodiment of this application. The terminal device 800 may be the terminal device in the foregoing method embodiments. As shown in FIG. 8, the terminal device 800 includes:

a processor 801, configured to control the terminal device 800 to enter an RRC inactive state; and a transceiver 802, configured to send, in the RRC inactive state, a data packet to a second network device.

In some embodiments, the data packet includes an indication field, a data field, and a MAC CE field, the MAC CE field is used to store identification information of the terminal device, and the indication field is used to indicate that the data packet includes the MAC CE field.

In some implementations, the transceiver 802 is further configured to receive a second message sent by the first network device, where the second message is used to indicate the second network device that can transmit data for the terminal device in the RRC inactive state.

In some embodiments, the second message includes identification information of all the second network devices that can transmit data for the terminal device in the RRC inactive state. In some embodiments, the second message includes bitmap information of an RNA of the first network device, and the bitmap information of the RNA of the first network device is used to identify, in an RNA range of the first network device, all the second network devices that can transmit data for the terminal device in the RRC inactive state. Optionally, the second message includes indicator bit information, and the indicator bit information is used to indicate whether all the second network devices in the RNA range of the first network device can transmit data for the terminal device in the RRC inactive state. Optionally, the second message further includes a bearer list, and the bearer list is used to indicate a bearer that can be provided by the second network device that can transmit data for the terminal device in the RRC inactive state.

The terminal device 800 in this embodiment of this application may be corresponding to the terminal device in the method in various embodiments, and the foregoing and other operations and/or functions of modules in the terminal device 800 are respectively intended to implement corresponding procedures of the methods. For brevity, details are not described herein again.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided herein, it should be understood that the disclosed system, device, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
  determining, by a first network device, that a terminal device enters a radio resource control (RRC) inactive state;

sending, by the first network device, a first message to a second network device, wherein the first message facilitates configuring the second network device to enable the second network device to transmit data for the terminal device in the RRC inactive state; and receiving, by the first network device, an acknowledgment message for the first message, the acknowledgment message being sent by the second network device;

wherein the first message comprises identification information of the first network device, identification information of the terminal device, a bearer to be provided by the second network device for transmitting data for the terminal device in the RRC inactive state, and address information of the bearer on an Xn interface of the first network device.

2. The method according to claim 1, wherein the first message further comprises at least one of the following information: network slice information of the bearer, logical channel configuration information corresponding to the bearer, or protocol stack configuration information corresponding to the bearer.

3. The method according to claim 1, wherein the acknowledgment message comprises a bearer that can be provided by the second network device.

4. The method according to claim 3, wherein the acknowledgment message further comprises address information corresponding to the bearer on an Xn interface of the second network device.

5. The method according to claim 1, after receiving, by the first network device, the acknowledgment message, further comprising: sending, by the first network device, a second message to the terminal device, wherein the second message indicates the second network device is capable of transmitting data for the terminal device in the RRC inactive state.

6. The method according to claim 5, wherein the second message comprises identification information of all the second network devices that can send data for the terminal device in the RRC inactive state.

7. The method according to claim 5, wherein the second message comprises bitmap information of a radio access network-based notification area RNA of the first network device, wherein the bitmap information of the RNA of the first network device facilitates identifying, in an RNA range of the first network device, all the second network devices capable of transmitting data for the terminal device in the RRC inactive state.

8. The method according to claim 5, wherein the second message comprises indicator bit information, and the indicator bit information indicates whether all the second network devices in a RNA range of the first network device capable of transmitting data for the terminal device in the RRC inactive state.

9. The method according to claim 5, wherein the second message further comprises a bearer list, wherein the bearer list indicates a bearer that can be provided by the second network device capable of transmitting data for the terminal device in the RRC inactive state.

10. The method according to claim 1, after receiving, by the first network device, an acknowledgment message, further comprising:

directly sending, by the first network device to a core network, a received data packet transmitted by the second network device, wherein the data packet transmitted by the second network device is a data packet sent by the terminal device in the RRC inactive state and received by the second network device.

11. The method according to claim 1, after receiving, by the first network device, the acknowledgment message, further comprising:

sending, by the first network device to a core network, a received data packet transmitted by the second network device and processed by using a protocol stack, wherein the protocol stack comprises at least one of the following layers: a physical (PHY) layer, a media access control (MAC) layer, a radio link control (RLC) layer, or a packet data convergence protocol (PDCP) layer.

12. The method according to claim 10, wherein the data packet sent by the terminal device in the RRC inactive state comprises an indication field, a data field, and a MAC CE field, the MAC CE field is used to store identification information of the terminal device, and the indication field is used to indicate that the data packet comprises the MAC CE field.

13. A data transmission method, comprising:

receiving, by a second network device, a first message sent by a first network device, wherein the first message facilitates configuring the second network device to enable the second network device to transmit data for a terminal device in an RRC inactive state; and sending, by the second network device, an acknowledgment message for the first message to the first network device;

wherein the first message comprises identification information of the first network device, identification information of the terminal device, a bearer that needs to be provided by the second network device for transmitting data for the terminal device in the RRC inactive state, and address information of the bearer on an Xn interface of the first network device.

14. The method according to claim 13, wherein the first message further comprises at least one of the following information: network slice information of the bearer, logical channel configuration information corresponding to the bearer, or protocol stack configuration information corresponding to the bearer.

15. The method according to claim 13, wherein the acknowledgment message for the first message comprises a bearer that can be provided by the second network device.

16. The method according to claim 15, wherein the acknowledgment message for the first message further comprises address information corresponding to the bearer on an Xn interface of the second network device.

17. The method according to claim 13, after the sending, by the second network device, an acknowledgment message for the first message to the first network device, further comprising:

receiving, by the second network device, a data packet sent by the terminal device in the RRC inactive state; and directly sending, by the second network device, the data packet to the first network device.

18. The method according to claim 13, after the sending, by the second network device, an acknowledgment message for the first message to the first network device, further comprising:

receiving, by the second network device, a data packet sent by the terminal device in the RRC inactive state;

processing, by the second network device, the data packet by using a protocol stack, wherein the protocol stack comprises at least one of the following layers: a physical (PHY) layer, a media access control (MAC) layer, a radio link control (RLC) layer, or a packet data convergence protocol (PDCP) layer; and sending, by the second network device, a processed data packet to the first network device.

\* \* \* \* \*